July 25, 1967     V. M. OBENHAUS     3,332,817

METHOD OF MAKING A MICA PAPER CAPACITOR

Filed March 24, 1966

VICTOR M. OBENHAUS
INVENTOR.

BY Connolly and Hutz

HIS ATTORNEYS

United States Patent Office 3,332,817
Patented July 25, 1967

3,332,817
METHOD OF MAKING A MICA PAPER CAPACITOR
Victor M. Obenhaus, North Adams, Mass., assignor to Sprague Electric Company, North Adams, Mass., a corporation of Massachusetts
Filed Mar. 24, 1966, Ser. No. 543,483
2 Claims. (Cl. 156—313)

This application is a continuation-in-part of Ser. No. 2,510 filed Jan. 14, 1960 now abandoned, which in turn is a continuation-in-part of Ser. No. 591,065 filed June 13, 1956 and issued Aug. 9, 1960, as U.S. Letters Patent 2,948,838.

This invention relates to a method of making mica paper capacitors, and more particularly to a method of making stacked and rolled mica paper capacitors of a solid shape retaining construction.

The development of reconstituted mica paper permitted the construction of capacitors that were beyond the scope of mica capacitors; for example, wound sections were made feasible, and uniform stacked sections of lower cost could be attained. However, prior to my invention, mica paper capacitors had not gained acceptance in the capacitor industry because of the weak bond between the minute flakes of mica making up the paper. The extreme care required in rolling or handling the mica paper to avoid pulling the sheets apart generally limited the applications to experimental constructions.

Prior to my invention attempts have been made to overcome some of the disadvantages of mica paper by careful preparation of capacitance sections and immediate impregnation with various liquid impregnants. These attempts suffered greatly from the point of cost of preparation and the gassing produced by the liquid impregnants. A further disadvantage of these prior mica paper capacitors involved the need for clamps or other confining means to prevent delamination of the capacitance sections.

It is an object of this invention to provide a method of making mica paper capacitor constructions that overcome the foregoing and related disadvantages of the prior art.

It is another object of this invention to provide a method of making mica paper capacitor constructions that are solid and less subject to damage than the prior art.

It is still another object of this invention to provide a method of making mica paper capacitors that do not require the use of the liquid impregnants of the prior art.

These and other objects of this invention will be understood more clearly from the following description of several of its exemplifications, with reference being made to the accompanying drawing, wherein.

Figure 1:
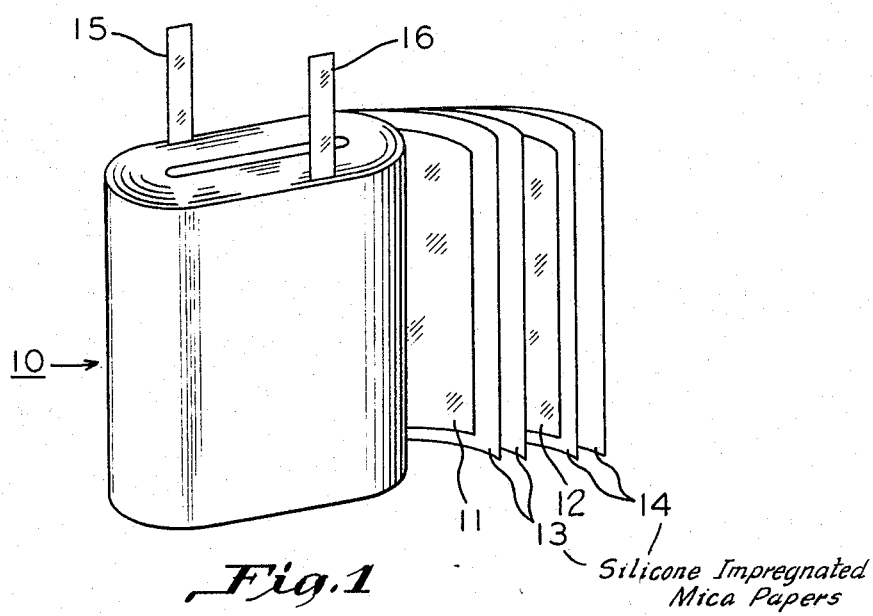
FIGURE 1 is a partially unrolled flattened capacitance section constructed in accordance with this invention.

In general, the objects of this invention are attained by laminating electrodes and spacers, the spacers being reconstituted mica paper that has been impregnated with silicone resin, wherein the resin is not fully cured, and then in-situ curing the resin by subjecting the laminate to heat and pressure.

More specifically, the objects of this invention are attained in accordance with one embodiment by convolutely winding electrodes separated by silicone resin impregnated mica paper on a large diameter mandrel, then flattening the wound section and curing the resin by subjecting the section to heat and pressure.

Another specific embodiment that attains the objects of this invention is a stacked section of electrodes separated by silicone resin impregnated mica paper wherein the stacking is facilitated by adhesion between the electrodes and the impregnated paper, and then curing the silicone resin to provide a solid section by subjecting the stack to heat and pressure. A plurality of these solid sections are then connected to constitute a capacitor.

While various silicone resins may be employed to impregnate reconstituted mica paper for use in this invention, it is preferred that the resin partially cure in air after the impregnation step is complete, and yet not fully cure or polymerize when stored at room temperature for a period of several months. The need for the partial cure is to reduce the tackiness associated with silicone resins, so as to permit the impregnated paper to be rolled on conventional rolling machines (FIGURE 1 construction) and stacked with electrodes by conventional stacking machines (FIGURE 2 construction).

One suitable silicone resin is a methyl polysiloxane prepared by hydrolyzing a silicon tetrachloride that has been methylated to $CH_3$:Si mol ratio of 1.4, as described in U.S. Letters Patent 2,258,218. This polymerization product is preferably used in an uncured or incompletely cured condition. After impregnation, the resin is cured by subjecting it to a temperature of 250° C. for at least seven hours. Lower temperatures and/or shorter times do not appear to be effective for a complete cure. As much as 96 curing hours can be used to advantage. Curing catalysts such as triethanolamine can be added to the uncured resin but lower the electrical resistance of the dielectric somewhat.

Instead of using a pure resin as an impregnant, the impregnation can be carried out with a solution of the resin in a solvent such as toluene. Curing is then best preceded by a low temperature treatment to volatilize away the residual solvent.

The resins described in Examples 2, 3, 5, 7 to 9 and 13 of U.S. Letters Patent 2,661,348 and in Example 4 of U.S. Letters Patent 2,652,385 are also suitable for use with the present invention. Other silicone resins that can be used are ethyl-phenyl-polysiloxanes, vinyl-totuyl-polysiloxanes, diphenyl polysiloxanes, etc., having between about 1.2 and 1.7 hydrocarbyl radicals per silicone atom.

The nature of mica paper is such that the preparation of the flakes leaves them in a surface active condition. A surface coating method of applying the silicone resin would in fact provide only a surface coating, because the silicone resin would not penetrate throughout the sheet. Pressure on the order of 500 to 1500 p.s.i. together with the application of heat to liquify the resin are necessary to force the silicone resin into the mica paper.

The preferred method of preparing the spacer material for use in this invention is a vacuum impregnation method, wherein a roll of reconstituted mica paper is vacuum dried, then vacuum impregnated with silicone resin, and then continuously removed from the roll and passed through a drying oven. The advantages of this vacuum method include the production of a mica paper in which the silicone resin is primarily within the paper, and not just on the surface.

Figure 2:
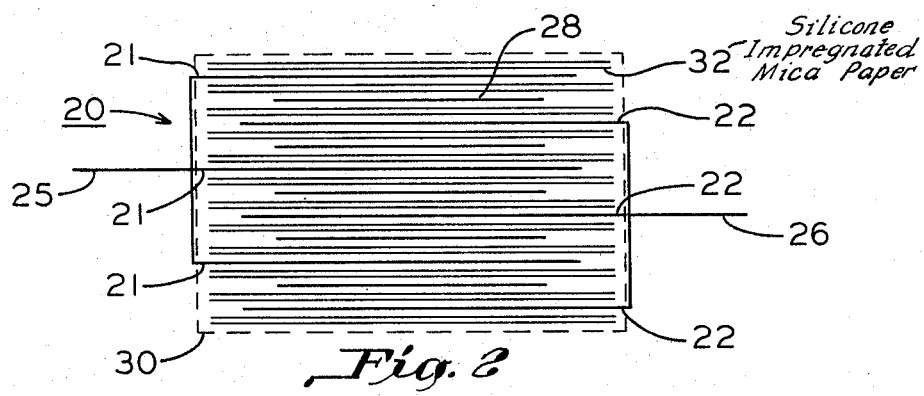
FIGURE 2 is a schematic showing of a characteristic stacked capacitance section constructed in accordance with another embodiment of this invention; and, FIGURE 3 is a flow chart showing a method of making capacitors in accordance with this invention.

The construction shown in FIGURE 1 is intended to be typical of the flattened convolutely-wound capacitance sections that may be constructed according to this invention. All of the conventional winding constructions are practical, such as tab-wound, extended-foil, and plate-wound. Tab-wound construction involves the use of terminal tabs which are secured to electrodes that are separated and completely covered by dielectric spacer members, so that only the tabs extend beyond the sides of the rolled section. Extended-foil construction involves the use of electrodes that have an edge extending beyond the side of the rolled section; usually an edge of one electrode extends beyond one side of the section, and an edge of another electrode extends beyond the opposite side of the section. Plate-wound construction involves the use of a single continuous strip of dielectric material that is wound with a plurality of electrodes inserted in the winding in insulated relation to one another. Plate-wound sections may employ tab or extended-foil type of terminations.

Inasmuch as capacitors constructed in accordance with this invention are suitable for high voltage operation, floating foils may advisedly be employed in any of the winding constructions to increase the corona starting voltage by decreasing the electrical stress at the edges of the electrode foils. As suggested by the name, the floating foils are not in electrical contact with either terminal of the capacitor.

Regardless of the type of winding construction the winding should be fashioned on a large diameter mandrel to avoid disruption of the bonds between the mica flakes forming the mica paper. FIGURE 1 shows a typical construction of this embodiment of the invention in which the silicone resin impregnated reconstituted mica paper is used as a dielectric. Although it has been found impractical to wind the mica paper dielectric on a mandrel having an outer diameter less than one-half inch, it is a feature of the present invention that a capacitor after winding around a large mandrel can then be flattened without creating any problems by reason of the creasing of the reconstituted mica paper at the flattened folds.

The construction of FIGURE 1 capacitance section 10 is originally wound around a mandrel at least one inch in outer diameter, using reconstituted mica paper layers 13 and 14, each 1½ to 2 mils thick. The winding is commenced with at least three turns of the double thickness paper, after which electrode foils 11 and 12 are inserted and carried through the remainder of the winding. The winding is then slipped off the mandrel and flattened by pressing. Aging before pressing in an atmosphere having a relative humidity of about 40% or more produces a very good product. Although the first few turns of paper are usually cracked at the foldover sites, the fourth and successive turns seem to be electrically sound, even though they may show signs of some cracking. Upon tests under breakdown conditions, breakdown usually occurs at other locations.

In the construction of FIGURE 1, tabs 15 and 16 are shown as provided for external connections. These tabs can merely be inserted in place, or where used under heavy current conditions, can be spot-welded to the respective electrodes 11 and 12.

As a specific example of the construction shown in FIGURE 1, capacitance sections were rolled with two ¼ mil aluminum foils, separated by two thicknesses (between each pair of opposed foil surfaces) of 2 mil silicone resin impregnated mica paper. The effective capacitive overlap of the foils was 100 inches. The rolling was done on a 1¼ inch mandrel with a total of 26 turns of which 22 turns provided the capacitive overlap of foils. The sections were flattened and maintained in a compressed condition while the silicone resin was cured for 24 hours at 250° C. The sections provided an average capacitance of 0.075 mfd. at 60 cycles, 200 volts.

The construction that is shown in schematic fashion in FIGURE 2 is intended to be typical of the stacked or stamp capacitance sections constructed in accordance with this invention. Section 20 comprises electrode foils 21 extending beyond one side of the section, and electrode foils 22 extending beyond the other side. Floating foils 28 are inserted between each set of foils 21 and 22. Two layers of silicone resin impregnated reconstituted mica paper 22 are inserted between foils 21, 22 and 28. Terminations 25 and 26 are attached to the extended margins of foils 21 and 22, respectively. Curing the silicone resin of layers 32 under conditions of heat and pressure produce a solid shape-retaining structure 30 which is not subject to delamination. The solid structure 30 requires no further impregnation, because there are no voids in the structure, and in fact is impermeable to capacitor dielectric liquids such as silicone oil.

It should be understood that the construction characterized in FIGURE 2 may also be produced in tab construction, or could employ integral tabs as taught by Peck et al. in U.S. Letters Patent 2,764,718 issued September 25, 1956.

As a specific example of the construction shown in FIGURE 2, capacitance sections were produced by stacking a total of 45 alternately extending lead foils of 0.4 mil to provide an effective capacitive overlap of ⅝ inch by 1⅝ inches. The foils were separated by two sheets of silicone-mica paper. After stacking, the sections were heated to the polymerization temperatures of 250° C. and pressure was maintained on the stack for 96 hours to ensure a complete cure. The capacitance sections exhibited an average capacitance of 0.013 mfd. at 60 cycles 500 volts.

The solid impermeable condition of the capacitance section of this invention is obtained by the in situ curing of the silicone resin impregnated mica paper under heat and pressure sufficient to produce a shape-retaining and void-free body upon release of the pressure.

Figure 3:
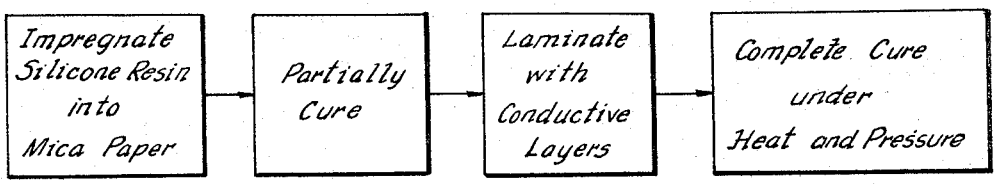

The flow chart of FIGURE 3 illustrates the essential steps that are employed in providing the capacitors of FIGURE 1 and FIGURE 2 in accordance with the method of this invention.

Inasmuch as lead compounds are catalysts for silicone resins, the use of lead foil is preferred to facilitate curing the capacitance sections. However, it should be understood that the use of all conventional electrode materials (such as, aluminum, copper, and Monel metal) are satisfactory for the purposes of this invention. Sections utilizing lead foil were found to be thermosetting at only 150° C., and accordingly provided a greater capacity stability than obtained with other metal foils.

Where the greatest possible capacitance is to be obtained from the winding, the flattened unit is preferably subjected to mechanical pressures to compact the layers as closely as possible. A pressure as high as 1000 pounds per square inch is suitable for use. When fully cured, the silicone resin acts to hold the layers of the winding together so that the capacitor will keep its compact, pressed shape, even though no pressure or clamp is used in the final assembly. When incompletely cured, the capacitor will show some drop in capacitance after heating to about 150° C., apparently because the layers will then tend to relax their compactness.

The stacked sections as shown in FIGURE 2 may be fabricated on conventional stamp capacitor jigs and fixtures, or may be on the annular devices shown by Grouse in U.S. Letters Patent 2,731,706 issued Jan. 24, 1956. A plurality of the sections of FIGURE 2 may be electrically connected and molded or cast as taught by Brafman in U.S. Letters Patent 2,777,976 issued Jan. 15, 1957.

Obviously many modifications and variations of the present invention are possible in the light of the above teachings. It is, therefore, to be understood that within the scope of the appended claims the invention may be practiced otherwise than as specifically described.

What is claimed is:

1. A method of making a capacitance section, which method includes the steps of impregnating silicone resin into mica paper, partially curing said paper, laminating electrically conductive layers with said paper therebetween, and completing the cure of said paper by heating the laminated assembly at a temperature of at least 250° C. and a pressure of at least 1000 p.s.i. for at least six hours, thereby obtaining a solid void-free impermeable capacitance section.

2. The method of claim 1 wherein said step of completing the cure of said paper is facilitated by catalytic action obtained by utilizing lead for said electrically conductive layers.

References Cited

UNITED STATES PATENTS

| | | | |
|---|---|---|---|
| 1,173,452 | 2/1916 | Meirowsky | 317—261 |
| 2,517,777 | 8/1950 | Fenn. | |
| 2,890,396 | 6/1959 | Hutzler | 317—258 |

LEWIS H. MYERS, *Primary Examiner.*

E. GOLDBERG, *Assistant Examiner.*